US012625695B2

(12) United States Patent
Popa et al.

(10) Patent No.: US 12,625,695 B2
(45) Date of Patent: *May 12, 2026

(54) APPLICATION HUB FOR APPLICATIONS FOR AN ANALYTICAL SERVICES PLATFORM

(71) Applicant: Waters Technologies Ireland Limited, Dublin (IE)

(72) Inventors: Coralia Popa, Brasov (RO); Alessio Zammataro, Wilmslow (GB); Richard Woodhead, Holmes Chapel (GB)

(73) Assignee: Waters Technologies Ireland Limited, Dublin (IE)

( * ) Notice: Subject to any disclaimer, the term of this patent is extended or adjusted under 35 U.S.C. 154(b) by 21 days.

This patent is subject to a terminal disclaimer.

(21) Appl. No.: 18/633,771

(22) Filed: Apr. 12, 2024

(65) Prior Publication Data

US 2024/0256261 A1 Aug. 1, 2024

Related U.S. Application Data

(63) Continuation of application No. 17/066,726, filed on Oct. 9, 2020, now Pat. No. 11,983,521.

(Continued)

(51) Int. Cl.
*G06F 8/65* (2018.01)
*G06F 3/04842* (2022.01)
(Continued)

(52) U.S. Cl.
CPC ................. *G06F 8/65* (2013.01); *G06F 8/61* (2013.01); *G06F 9/547* (2013.01); *H04L 63/083* (2013.01);
(Continued)

(58) Field of Classification Search
CPC ... G06F 8/65; G06F 8/61; G06F 9/547; G06F 3/04842; G06F 9/451; H04L 63/083; H04L 63/0884; H04L 67/34
See application file for complete search history.

(56) References Cited

U.S. PATENT DOCUMENTS

| | | | | |
|---|---|---|---|---|
| 8,494,966 B2 * | 7/2013 | Xu | ........................ | G06F 21/105 |
| | | | | 705/57 |
| 11,379,102 B1 * | 7/2022 | Brannam | ................ | G06F 8/658 |

(Continued)

FOREIGN PATENT DOCUMENTS

| | | |
|---|---|---|
| CN | 103402195 A | 11/2013 |
| CN | 106664323 A | 5/2017 |

(Continued)

OTHER PUBLICATIONS

International Search Report and Written Opinion for International Patent Application No. PCT/IB2020/059522, mailed Jan. 12, 2021.
(Continued)

*Primary Examiner* — Mohammad W Reza
(74) *Attorney, Agent, or Firm* — Goodwin Procter LLP

(57) ABSTRACT

An application hub is provided for applications of an analytical services platform. The analytical services platform may receive data from analytical devices and provide services, such as filtering, processing and visualizing the data. The application hub may act as a landing site for users on client devices to launch applications for the analytical services platform. The application hub may provide a web page to the client devices over a network that provides a user interface listing applications for the analytical services platform. Users may launch the applications through the user interface, such as by selecting user interface elements for the applications. The user interface may identify what applications have been installed on a client device and what applications have not been installed. The user interface may (Continued)

also identify when an application needs to be upgraded. Since the application hub is intended to be a single landing site for al applications, a single login may be provided.

14 Claims, 16 Drawing Sheets

Related U.S. Application Data

(60) Provisional application No. 62/913,603, filed on Oct. 10, 2019.

(51) Int. Cl.

| | |
|---|---|
| *G06F 8/61* | (2018.01) |
| *G06F 9/54* | (2006.01) |
| *H04L 9/40* | (2022.01) |
| *H04L 67/00* | (2022.01) |

(52) U.S. Cl.
CPC .......... *H04L 63/0884* (2013.01); *H04L 67/34* (2013.01); *G06F 3/04842* (2013.01)

(56) References Cited

U.S. PATENT DOCUMENTS

| | | | |
|---|---|---|---|
| 2013/0247030 A1 | 9/2013 | Kay et al. | |
| 2014/0279550 A1* | 9/2014 | Zhang | G06F 21/105 |
| | | | 705/59 |
| 2014/0316990 A1 | 10/2014 | Winston | |
| 2017/0142094 A1 | 5/2017 | Doitch et al. | |
| 2017/0237791 A1* | 8/2017 | Teng | H04L 65/612 |
| | | | 709/219 |
| 2017/0300316 A1* | 10/2017 | Lopyrev | H04L 67/34 |
| 2019/0147145 A1* | 5/2019 | Matsudaira | G06F 21/105 |
| | | | 726/27 |
| 2019/0215337 A1 | 7/2019 | Trabelsi et al. | |
| 2020/0151304 A1 | 5/2020 | Trueba et al. | |
| 2021/0263506 A1 | 8/2021 | Wang et al. | |

FOREIGN PATENT DOCUMENTS

| | | |
|---|---|---|
| CN | 109891408 A | 6/2019 |
| EP | 3428808 A1 | 1/2019 |

OTHER PUBLICATIONS

International Preliminary Report on Patentability for International Patent Application No. PCT/IB2020/059522, mailed Apr. 12, 2022.

* cited by examiner

APPLICATION HUB FOR APPLICATIONS FOR AN ANALYTICAL SERVICES PLATFORM

CROSS-REFERENCE TO RELATED APPLICATIONS

This application is a continuation of U.S. patent application Ser. No. 17/066,726, filed Oct. 9, 2020, which claims the benefit of and priority to U.S. Provisional Patent Application No. 62/913,603, filed on Oct. 10, 2019, the entire contents of which are hereby incorporated by reference.

BACKGROUND

Users of mass spectrometry systems and liquid chromatography systems have to contend with a disjointed landscape of software tools. There may be separate tools for the different types of systems. Moreover, there may be separate software tools for each type of functionality, such as data acquisition, data processing, visualization, reporting and compliance. In addition, a user must separately login to each of the tools to gain access to the tools.

SUMMARY

There is a need for an integrated solution for the software tools for analytical devices such as mass spectrometry and liquid chromatography devices. The exemplary embodiments attempt to address this need.

In accordance with an exemplary embodiment, a method is performed by a client computing device. Per the method, a user interface is received at the client computing device from an application hub running on an application hub computing device. The application hub serves as a landing site where a client may launch applications for an analytical services platform on the client computing device, and the user interface identifies a selected one of the applications as not installed on the client computing device. Input is received via the user interface on the client computing device. The input indicates a request to install the selected application on the client device. Based on the received communication, the selected application is retrieved from an application repository, and the retrieved selected application is installed on the client computing device.

An application hub client may be installed on the client computing device and an application hub client services may be installed on the client computing device. The retrieving of the selected application may include sending a request to retrieve the selected application from the application hub client to the application hub client services. The retrieving of the selected application may include receiving the selected application at the application hub client services from the application repository. The installing of the selected application may be initiated by the application hub client services. The application hub client services may have administrative privileges on the client computing device.

In accordance with an exemplary embodiment, a method is performed by a client computing device. In this method, a user interface is received from an application hub running on the application hub computing device at a client computing device. The application hub serves as a landing site where a client via the client computing device launches applications for an analytical services platform. The user interface identifies a selected application as needing to be updated. Based on input received via the user interface at the client computing device, an update to the selected application is obtained. The update of the selected application on the client computing device is performed as a background process.

An application hub client services may be installed on the client computing device. The obtaining of the update may include the application hub client services retrieving an updated version of the selected application from an application repository. The application repository may be remote from the client computing device. Performing the update may include installing the retrieved selected application on the client computing device. The installing of the retrieved selected application may include the application hub client services launching an installer to install the retrieved selected application. The input received via the user interface may be indicative of selection of a user interface element of the user interface for the selected application. The method may further include determining whether a version of the selected application is a current version.

In accordance with an exemplary embodiment, a method is performed on an application hub computing device. Per this method, a user login user interface is transmitted to a client computing device from an application hub running on the application hub computing device. The user login user interface prompts a user to provide credentials to login to an application hub. The credentials are received at the application hub from the client computing device. The credentials are sent from the application hub to an authentication service. An indication is received at the application hub that the user has been authenticated. Access is granted to the user to execute one or more applications for an analytical services platform via the application hub where the user is not required to again authenticate to execute the one or more applications.

An authorization code may be requested, and an authorization code may be received in response to the request. An application may be launched, and the authorization code may be to an application repository.

DETAILED DESCRIPTION

Exemplary embodiments described herein provide an application hub for applications of an analytical services platform. The analytical services platform may receive data from analytical devices and provide services, such as but not limited to filtering, processing and visualizing of the data. The application hub may act as a landing site for users on client devices to launch applications for the analytical services platform. In some exemplary embodiments, the application hub may provide a web page to the client computing devices over a network. The web page may provide a user interface listing applications for the analytical services platform. Users may launch the applications through the user interface, such as by selecting user interface elements provided for the applications.

The user interface may identify what applications have been installed on a client device and what applications have not been installed. For example, visual cues may be provided on the user interface that distinguish between installed applications and uninstalled applications. This provides a quick and easy way for a user to know what applications are available for installation. The user interface may also provide a mechanism for a user to install an application that is uninstalled on a client computing device. In some exemplary embodiments, icons are provided for each of the applications and taking an action, such as selection of the icon or otherwise activating the icon, initiates installation of the application on the client computing device.

The user interface may also identify when an application needs to be upgraded. For instance, visual cues of the need for an upgrade may be provided. An icon associated with the application may have a modified appearance indicating that an upgrade is needed. The need for an upgrade may be automatically determined without the need for user intervention by comparing a version number of the application installed on the client device with a version number of the application that is available for installation. A user may initiate the upgrade of an application through the user interface. In one instance, a user selects an icon associated with the application to initiate the upgrade. The upgrade is realized by installing the upgraded version of the application on the client device.

Since the application hub is intended to be a single landing site for all applications, a single login may be provided. In particular, a user may be prompted to provide their credentials when seeking access to the application hub. Once the user is successfully logged in, the user may not need to provide credentials again to launch the applications shown on the user interface. This simplifies the process of launching applications by eliminating the need for the user to login or otherwise demonstrate credentials for each application.

Figure 1:
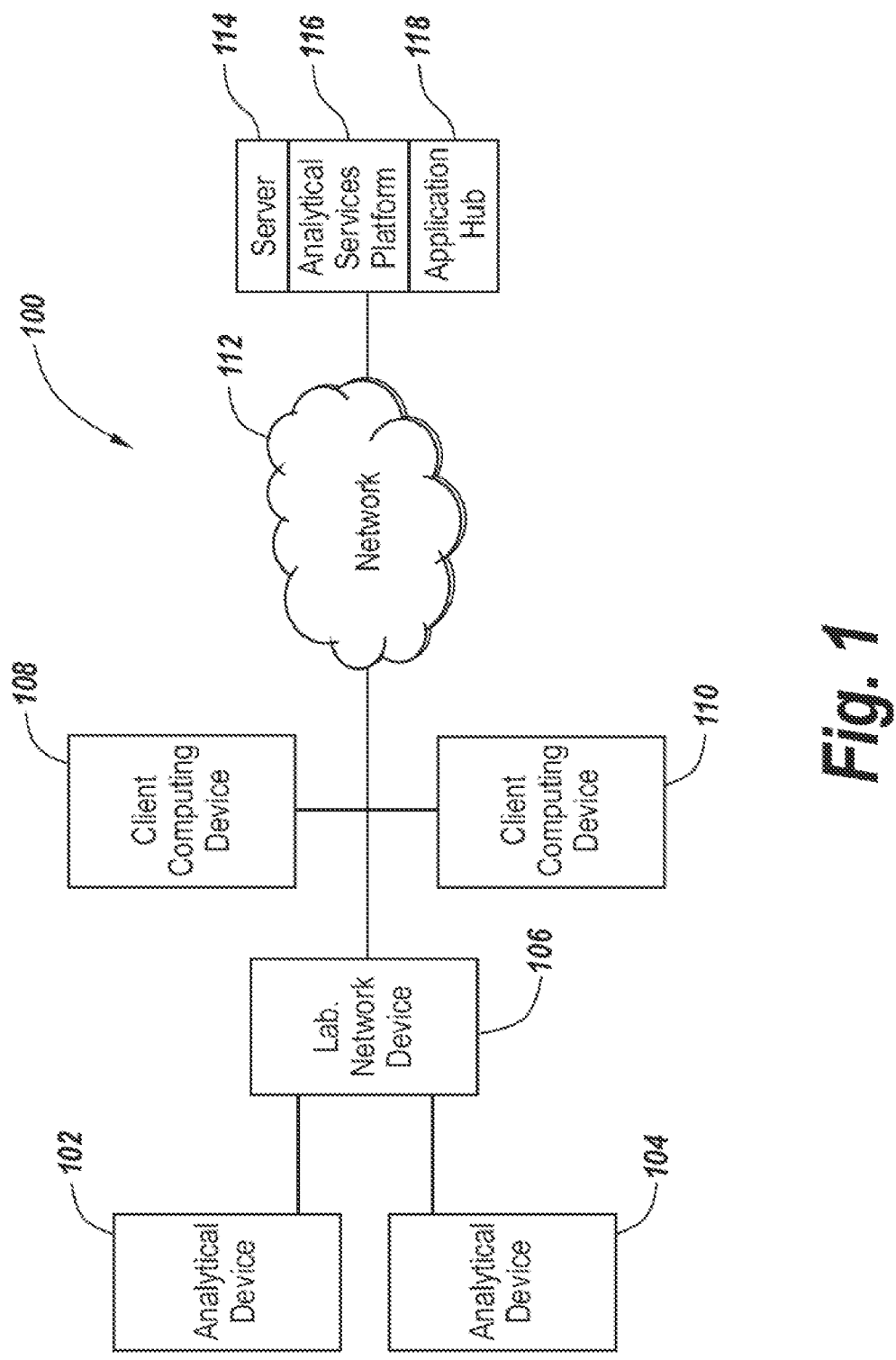
FIG. 1 depicts a block diagram of an environment suitable for practicing exemplary embodiments.

FIG. 1 shows an example of an environment 100 that may be suitable for practicing exemplary embodiments. The depiction is intended to be illustrative and not limiting. The environment 100 may include analytical devices 102 and 104. The analytical devices may take many different forms. Examples of analytical devices include mass spectrometry (MS) devices, liquid chromatography (LC) devices, an LC-MS system, a mass analyzer system, an ion mobility spectrometer (IMS) system, a high-performance liquid chromatography (HPLC) system, a ultra-performance liquid chromatography (UPLC®) system, a ultra-high performance liquid chromatography (UHPLC) system, a solid-phase extraction system, a sample preparation system, a heater (for example, a column heater), a sample manager, a solvent manager, an in vitro device (IVD), combinations thereof, components thereof, variations thereof and more generally devices that perform analytical services.

In exemplary embodiments, an analytical service may include a process and any process information (for instance, parameters, settings, thresholds, and/or the like) that are required to perform a process, method, analysis, test, and/or the like on an analytical device. In some embodiments, an analytical service may be developed, refined, tuned, and/or the like using a primary analytical system.

The analytical devices 102 and 104 may be present in a laboratory environment in many instances. A laboratory network device 106 may be provided to interface with the analytical devices 102 and 104 over a network, such as a local area network (LAN). The laboratory network device 106 facilitates communication with the analytical devices and enables data gathered from the analytical devices 102 and 104 to be passed on to the network 112 and accessible by client computing device 108 and 110. The client computing devices may be workstations, desktop computers, laptop computers or other types of computing devices. Users of the client devices 108 and 110 may communicate over the network 112 with a server 114. The server 114 may be a server computing device and may run computer program code for analytical services platform 116 and application hub 118. The analytical services platform 116 and the application hub 118 need not be resident on a single server 114. In addition, the analytical services platform 116 may be spread across multiple servers a in some instances. The network 112 may be a wide area network (WAN), such as the internet, and may include wireless networking components as well as har-wired networking components.

The analytical services platform 116 may perform analytical services on data obtained from the analytical devices 102 and 104. The analytical services platform 116 may provide data acquisition, processing, visualization, reporting, and configurable compliance tools within a networked environment. One non-limiting example of an analytical services platform is the UNIFI scientific information systems platform from Waters Corporation of Milford, Massachusetts.

As was discussed above, the applications hub 118 serves as a central hub where users may locate and execute applications on client computing devices for 108 and 110 for the analytical services platform 116.

Figure 2A:
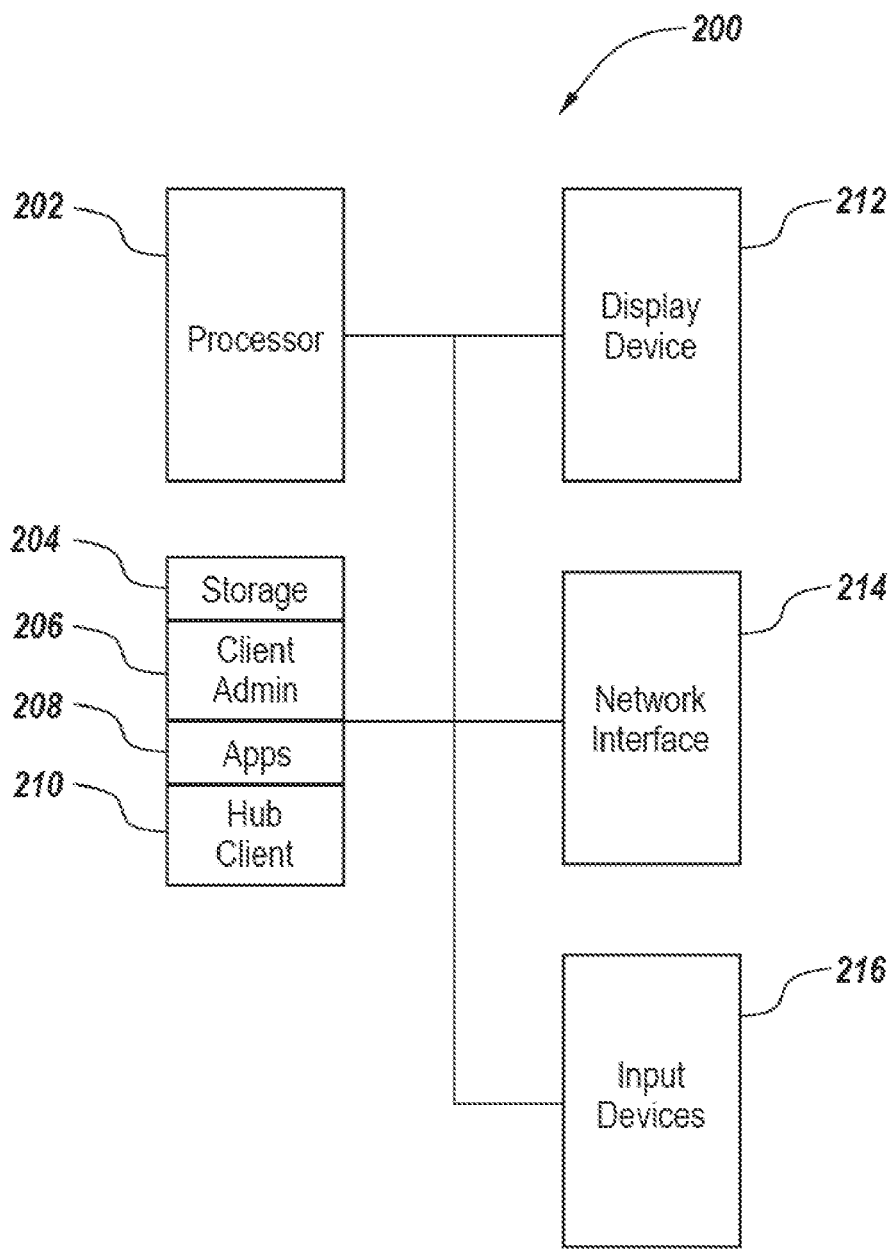
FIG. 2A depicts a block diagram of an illustrative client computing device.

FIG. 2A depicts a more detailed view of an illustrative client computing device 200. The client computing device includes a processor 202. The processor 202 may take many different forms. For example, the processor 202 may include a central processing unit (CPU) realized as an integrated circuit, an application specific integrated circuit (ASIC), a programmable logic device (PLD), a digital signal processor (DSP), field programmable gate array (FPGA), a system-on-a-chip (SoC) or electric circuitry. The processor 202 may include multiple cores. The processor 202 may executes computer-executable instructions stored in the storage 204.

The storage 204 may include one or more types of storage devices. For instance, the storage 204 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable program-mable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, storage 204 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

The storage 204 may hold data, documents and computer programs. In the depiction in FIG. 2A, the storage stores applications 208 and components 206 and 208 that relate to the application hub. Specifically, the components include an application hub client that serves as a client of the applica-tion hub and an application hub client services 206 that provides client services and has administrative privileges. These components 206 and 208 will be described in more detail below.

The client computing device 200 may include a display device 212, such as a liquid crystal display (LCD) or a light emitting diode (LED) display, or the like. The client com-puting device 200 may include a network interface 216 for interfacing with a network and input devices 214, such as a keyboard, mouse, thumbpad, etc.

Figure 2B:
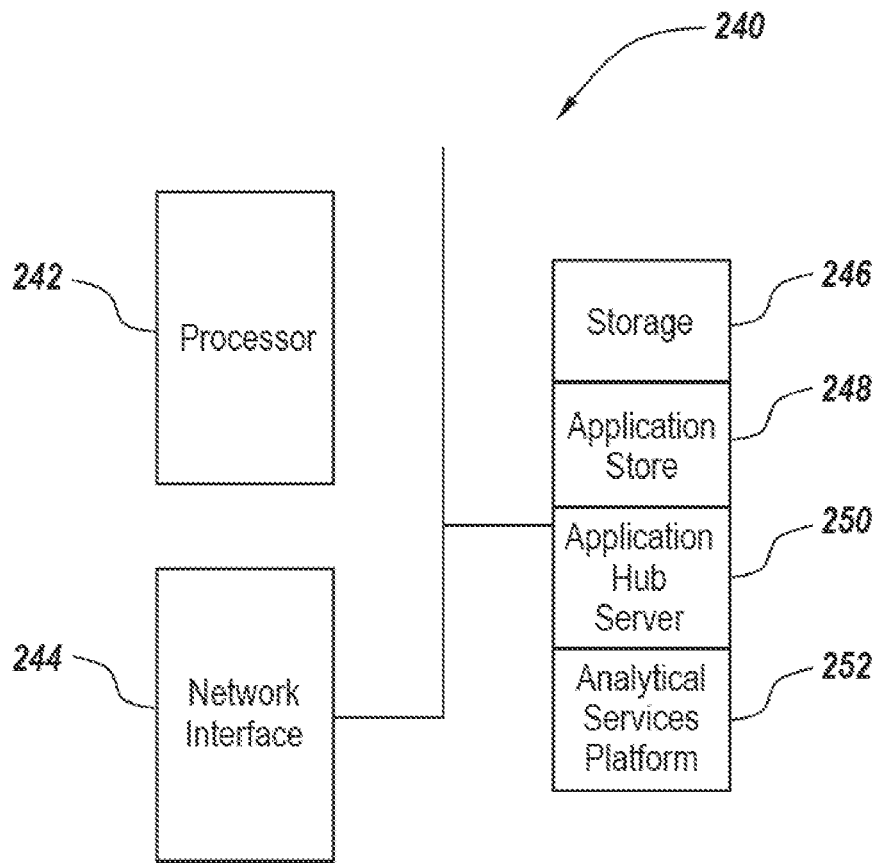
FIG. 2B depicts a block diagram of an illustrative server computing device.

FIG. 2B shows a more detailed view of an illustrative server computing device 240. The server computing device 240 may include a processor 240. The processor may take numerous different forms, such as those described above for processor 202. The server computing device 240 may include a network interface 244 for connecting to a network, like network 112 (FIG. 1). The server computing device 240 may include storage 246. The storage may include different types of storage components and/or devices like those describe above for storage 204. The storage 246 is shown storing application store 250 and application hub server 248. As will be described in more detail below, the application store is an application repository, and the application hub server 248 is a server component for the application hub. The storage may also store the analytical services platform 252.

Figure 3:
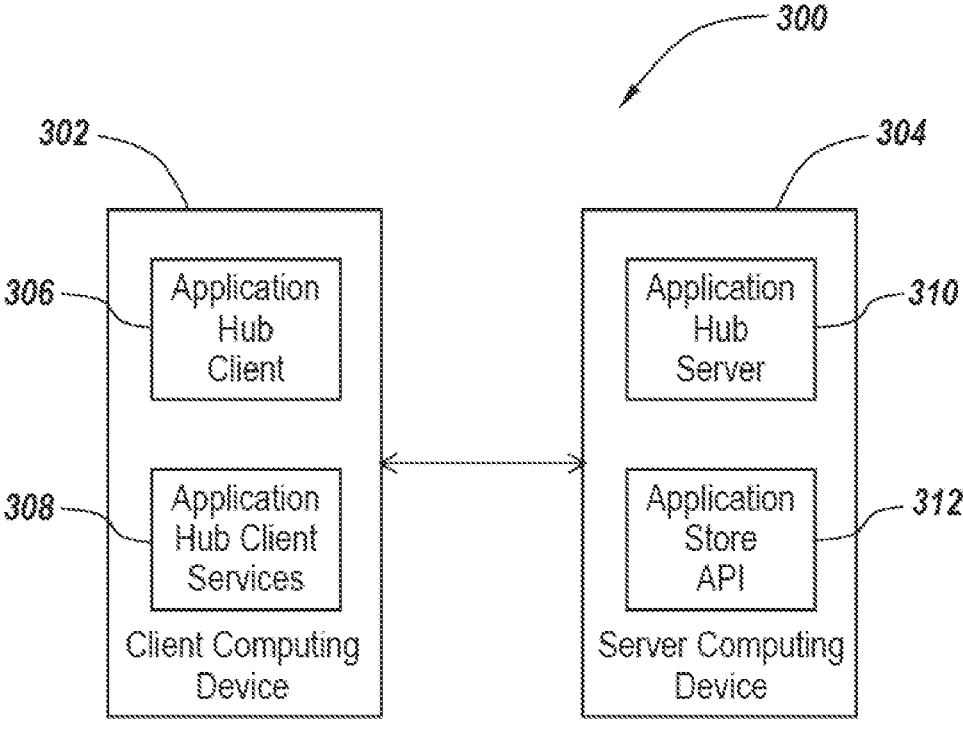
FIG. 3 depicts a block diagram of illustrative components of an application hub.

The application hub may have server-side components and client-side components. The application hub may follow a client/server paradigm where the server serves the client. FIG. 3 shows a diagram 300 depicting an illustrative con-figuration. The diagram 300 shows a client computing device 302 and a server computing device 304. Application hub client 306 and application hub client services 308 are on the client computing device. Application hub server 310 and application store API are on the server computing device 304.

Figure 4:
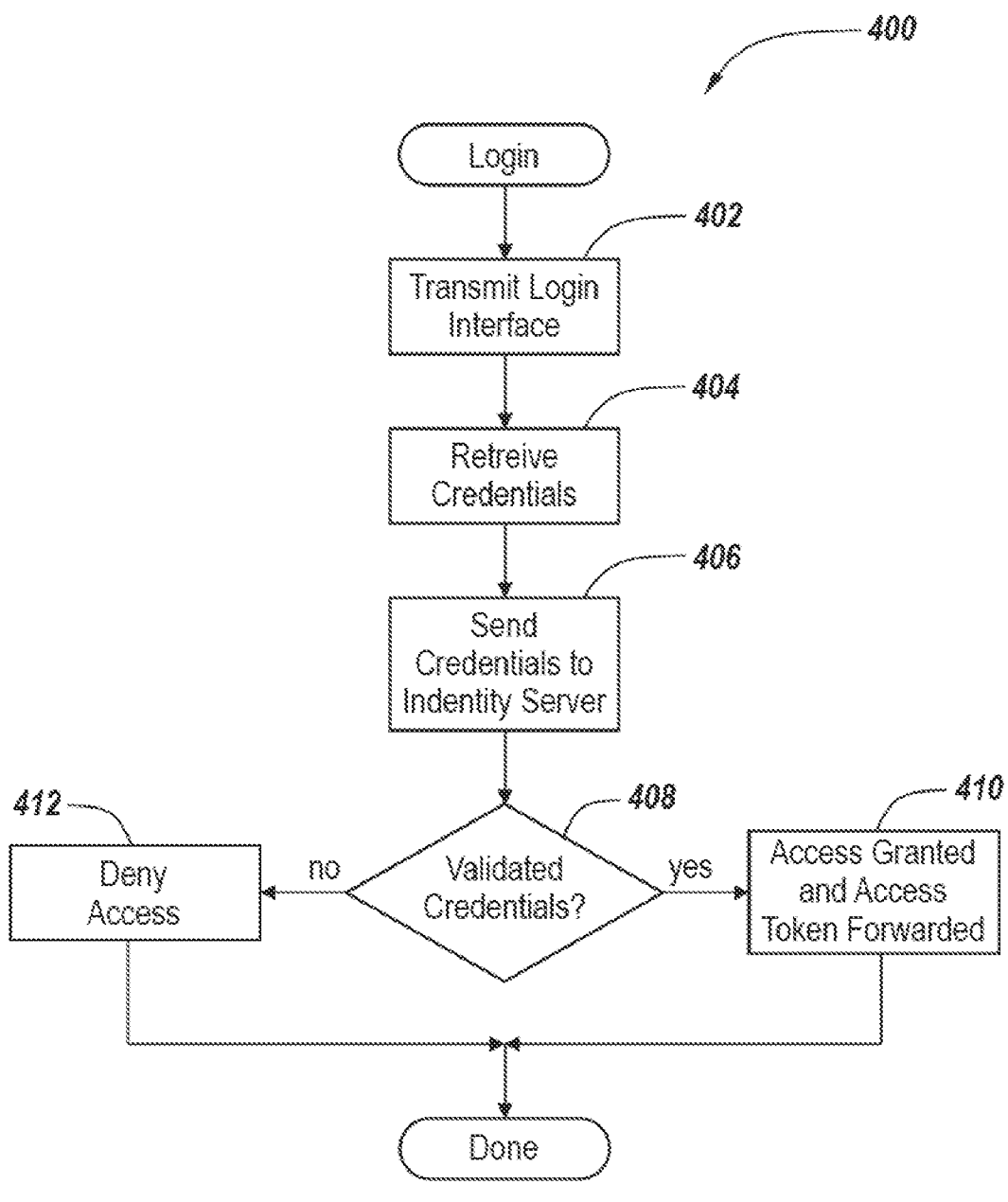
FIG. 4 depicts a flowchart of steps that may be performed for a user to login to an application hub in exemplary embodiments.
Figure 5:
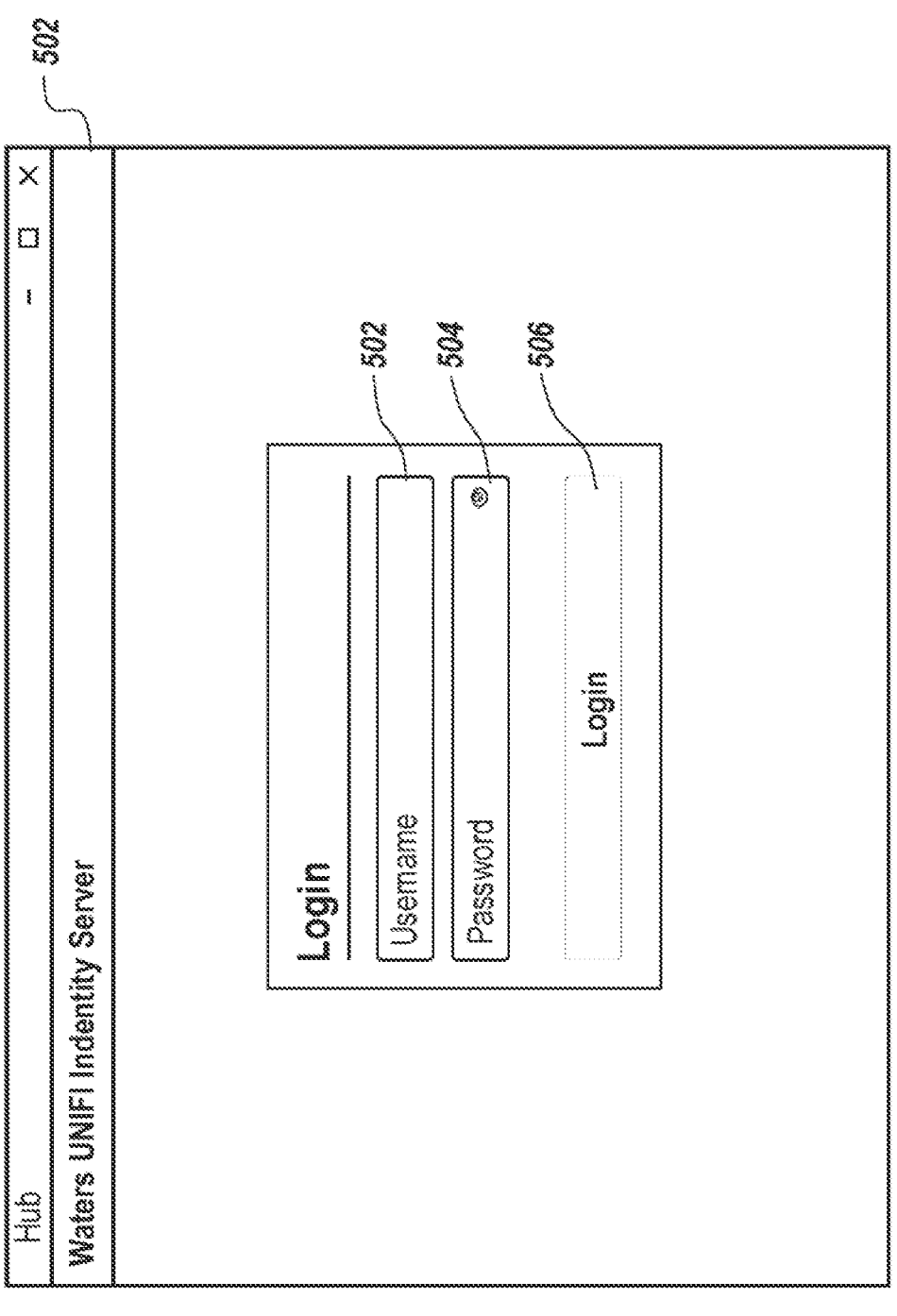
FIG. 5 depicts an illustrative login user interface for an application hub.

As was mentioned above, the application hub facilitates a single login for a user for multiple applications. FIG. 4 shows a flowchart 400 of steps that may be performed for such a single login functionality. Initially, the application hub may transmit a login interface to the client computing device (402). The user interface may, in some embodiments, be part of a webpage transmitted as an HTML file, XML file or in another format for display at the client computing device. FIG. 5 shows an example of an illustrative login user interface 500. A text box 502 is provided for a used to enter a username. A text box 504 is provided for a user to enter a password. Once the username and password have been entered, a login button 506 may be activated (such as by clicking on the login button 506). The credentials (i.e., username and password) are then sent and received (404) and send to an identity server (406). The identity server may be resident on the server computing system and provided as part of the analytical services platform. The identity server determines if a proper username and password were entered (408). If valid credentials were provided, access to the application hub is granted and an access token is provided to the client (410). The access token may be subsequently submitted to show access rights when applications are launched. If valid credentials are not provided, access to the application hub is denied (412).

Figure 6:
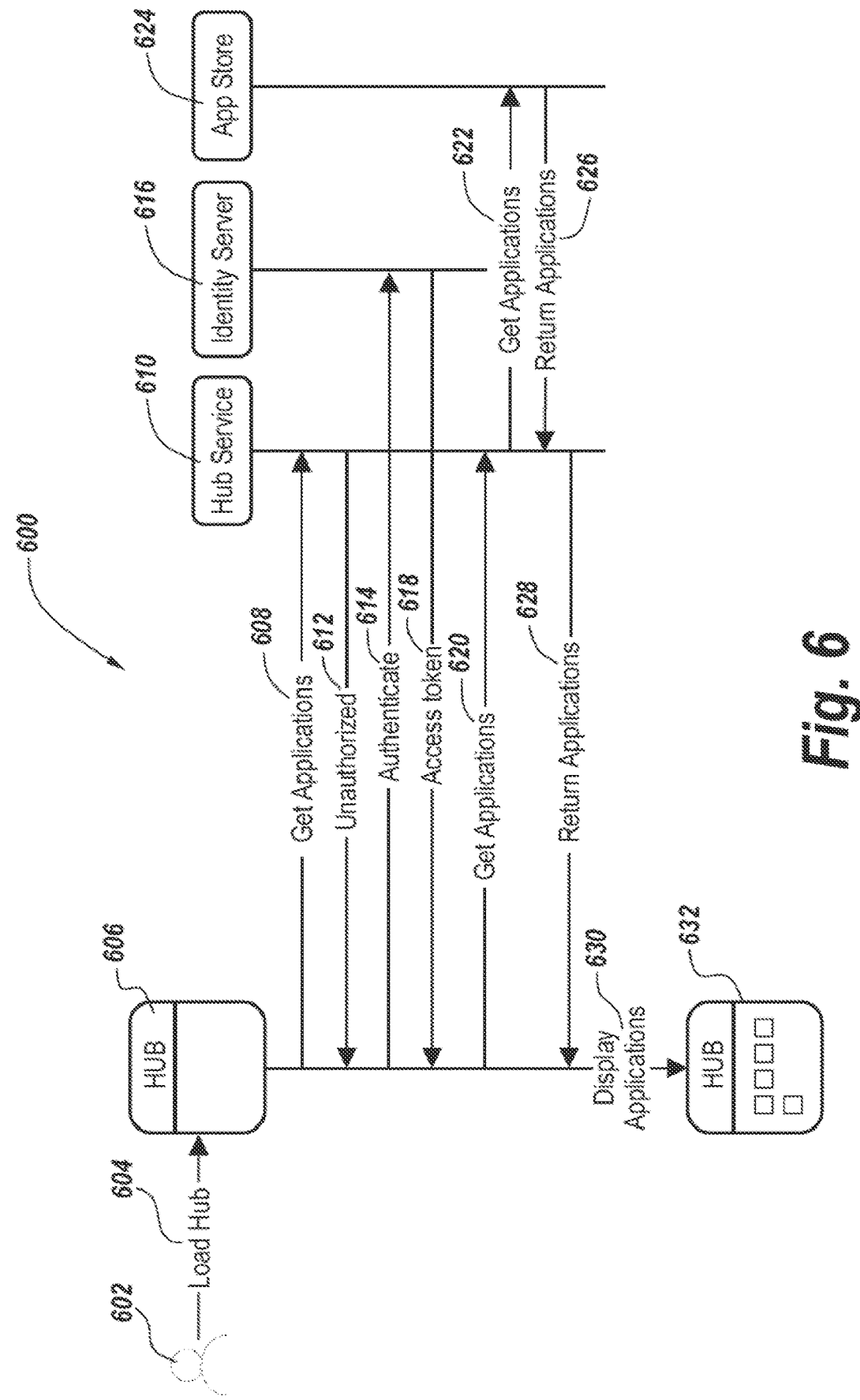
FIG. 6 depicts actions that may be taken to display applications on an application hub user interface in exemplary embodiments.

A number of different steps must be taken in order for the application hub to display a user interface with a list of applications for the analytical services platform to be dis-played. FIG. 6 shows a diagram of what steps may be performed. Initially, the user 602 requests 604 to load the applications. A first request 608 may be made to get a list of the applications suitable for the user but is returned as unauthorized 612 as the user is not logged in. The user logs in and the credentials are sent to the identity server 616 as mentioned above. An access token is returned 618 from the identity server 616 in the case where valid credentials were provided. Another request 628 to get applications may be submitted to the application hub server 610. A request 622 to get the list of applications from the app store 624 may be sent in response. The app store 624 returns the list of applications 626 that are available and suitable for the user. The list may include information for each application, such as application ID, application name and icon. The list may be transmitted as a JavaScript Object Notation (JSON) file in some exemplary embodiments. The information in the list may then be sent 628 to the client and used to display the applications in the list of the application hub user interface 630. The applications may include applications installed on the client computing device as well as applications installed on a server and accessible at the client computing device, such as through a web browser over a web interface.

Figure 7:
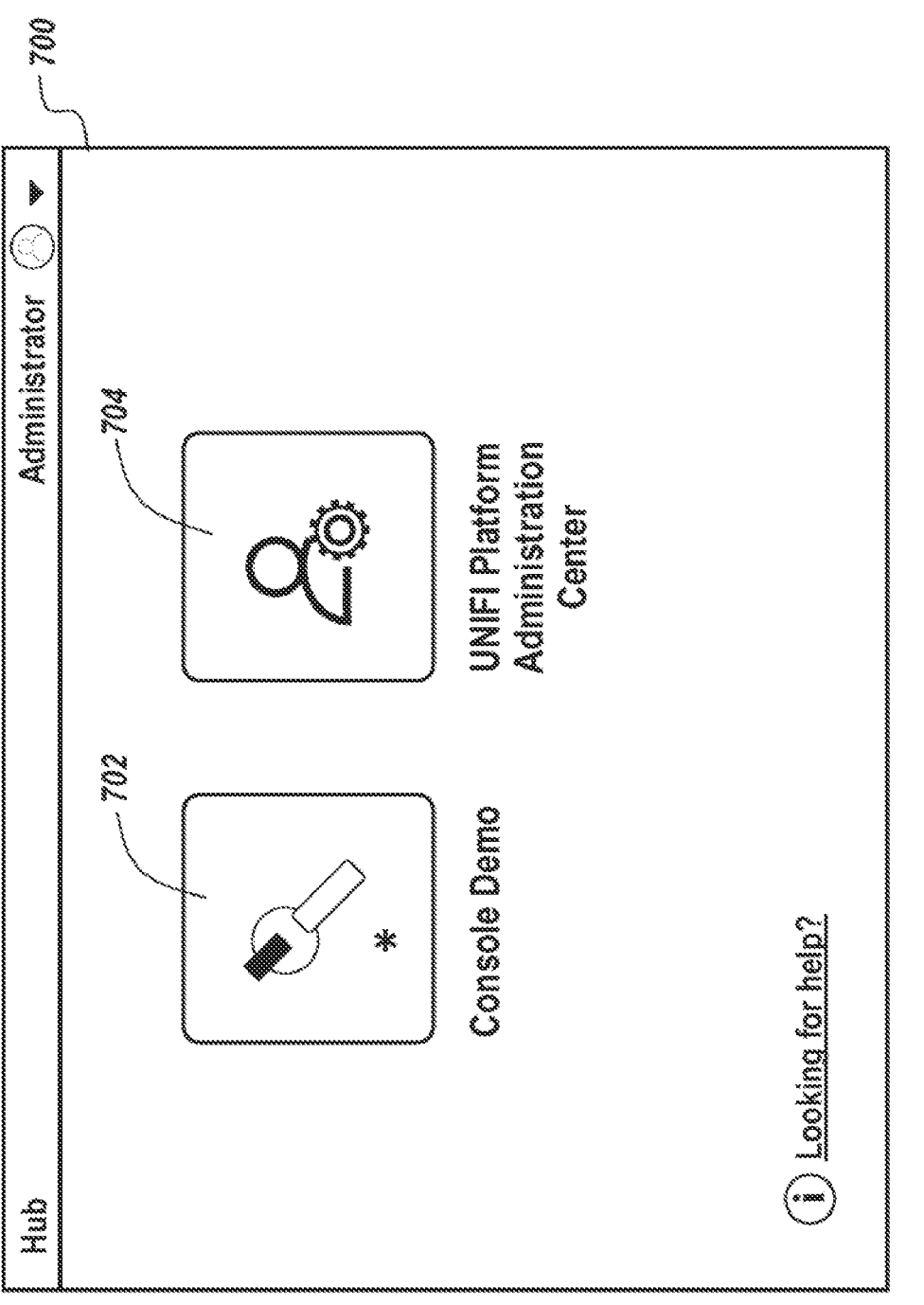
FIG. 7 depicts an illustrative user interface for an application hub wherein an application is installed and another application is uninstalled.

FIG. 7 shows an example of a user interface 700 display-ing applications that are available to the user. In this instance, a first icon 702 is displayed for a console demo application and a second icon 704 is displayed for the platform administration center. The names of these applica-tions and the information shown in the icons may be derived from the JSON file list of applications. The background of the icon 702 is filled in with a solid color to denote that the console demo application has already been installed on the client computing device and that are not server installed. A list of installed applications may be maintained and used to determine if an application has been installed or not. In contrast, the background of icon 704 is transparent to indicate that the platform administration center application is available but has not yet been installed. Other visual cues may be used to distinguish installed application from uninstalled applications. For instance, different colors for the icons may be used, the shapes of the icons may vary, text may be provided in the icons to identify an application as installed or uninstalled, etc.

Figure 8A:
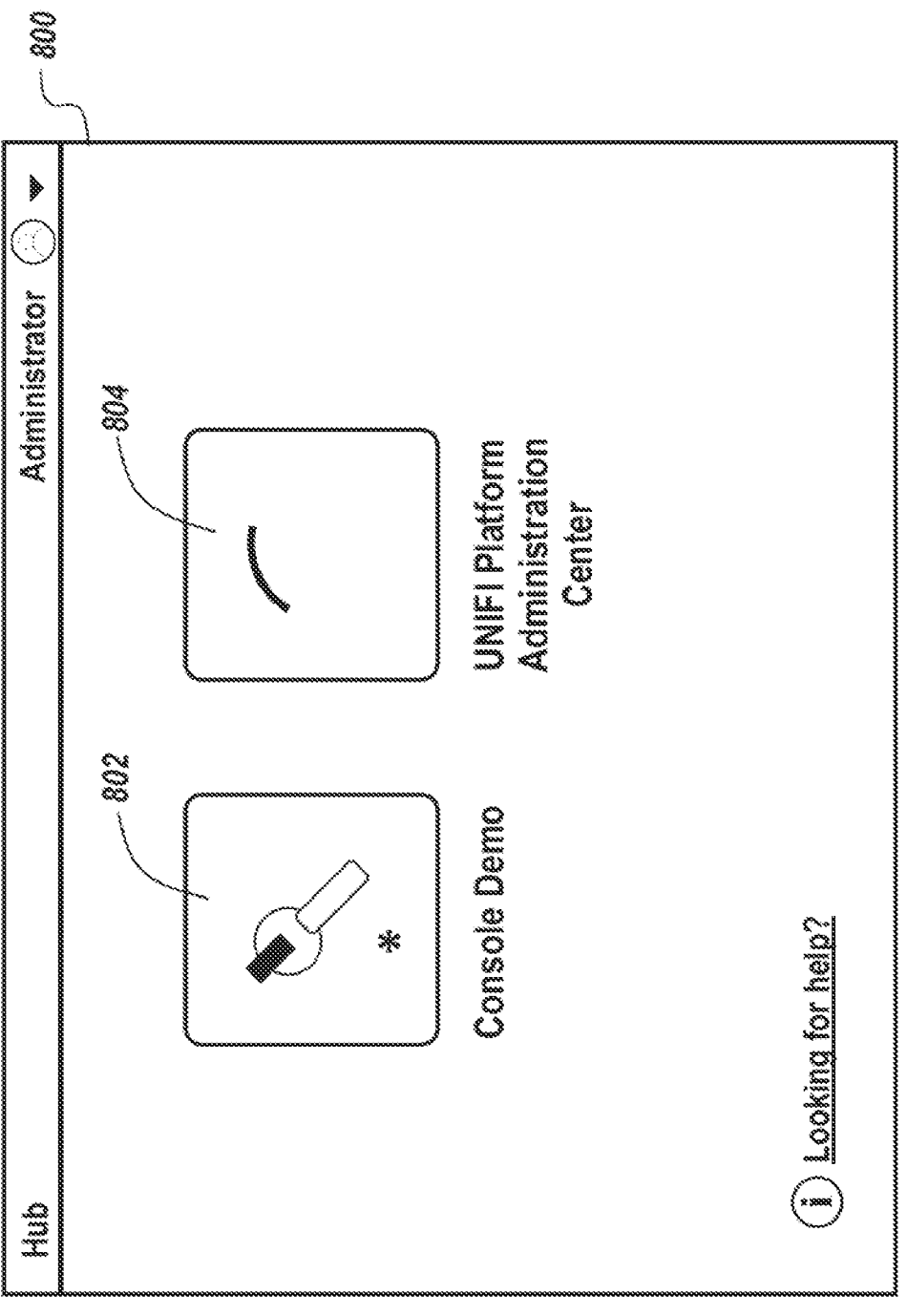
FIG. 8A depicts a user interface illustrating the changing appearance of an application icon to indicate that the installation of the application is underway.
Figure 8B:
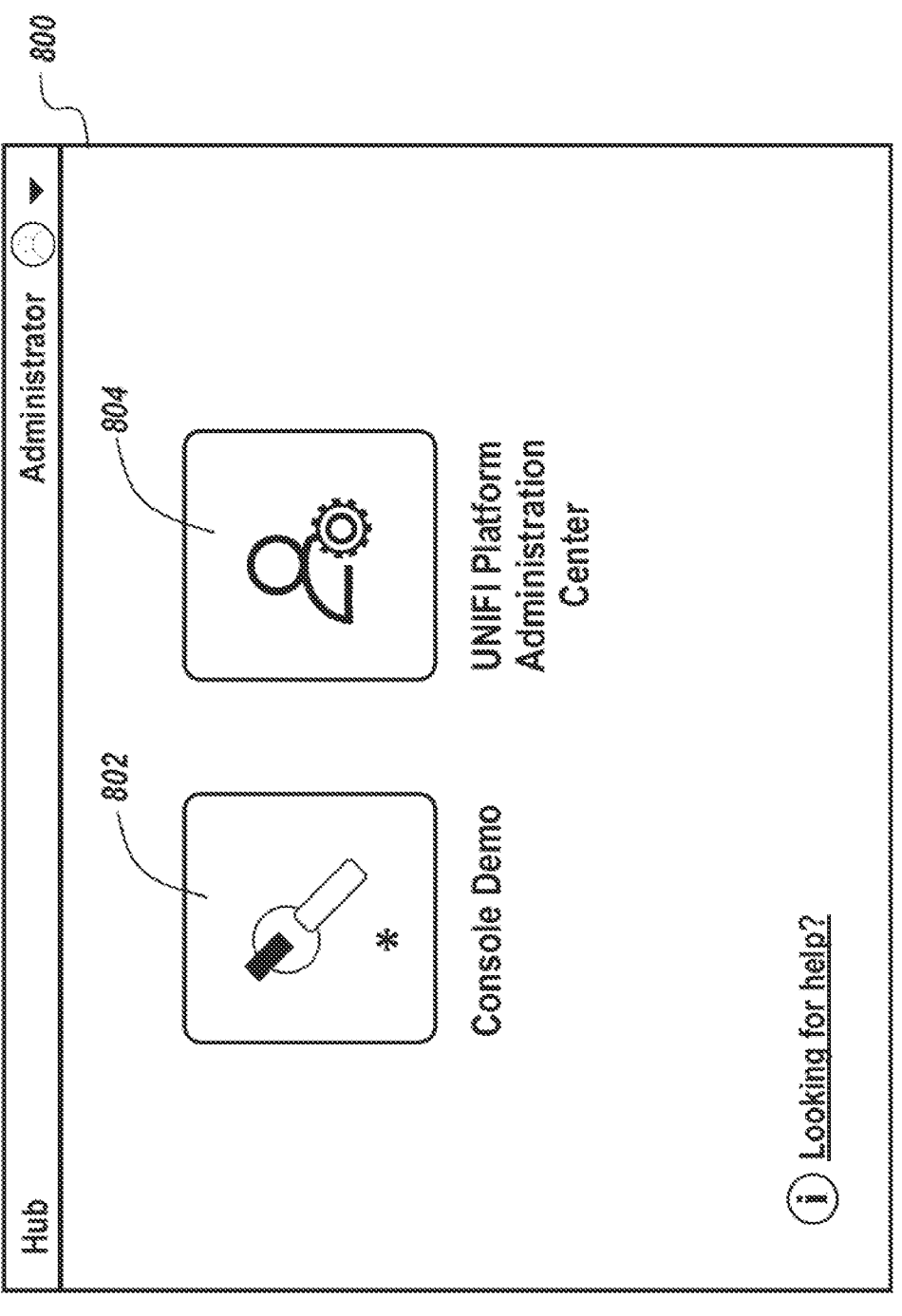
FIG. 8B depicts the user interface of FIG. 8A after installation of the previously uninstalled application is completed.

A user may initiate installation of an application by taking a designated action via the user interface, such as by, for example, pointing a pointer at a cursor at an icon and clicking may trigger installation of an application. It should be appreciated that other actions to select the application icon or activate the icon may be used. Moreover, user interface elements, such as menus and activatable control may be used to initiate application installation. In the example of FIG. 7, clicking on the icon 704 may initiate the installation of the platform application console. Once the icon 704 is selected, the appearance of the icon may be changed to be like that of icon 802 in the user interface shown in FIG. 8A to indicate that installation is in progress. The icon 802 for the console demo does not change. Once the installation is complete, the icon 804 (FIG. 8B) changes to have a solid background rather than a transparent background to indicate that the platform administration console has been installed.

Figure 9:
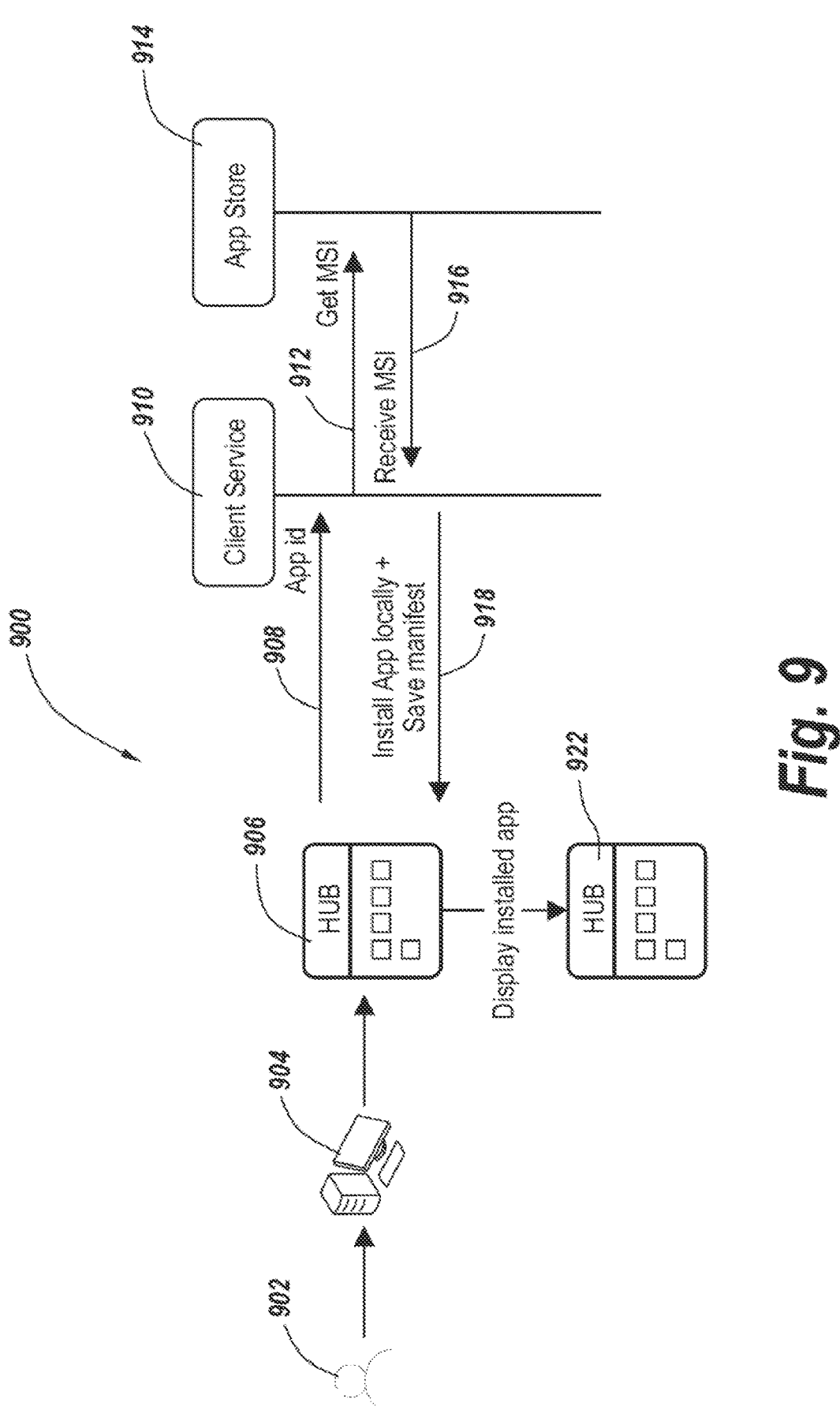
FIG. 9 depicts actions that may be taken to install an application on a client computing device in exemplary embodiments.

FIG. 9 shows a diagram 900 depicting steps that may be taken to install an application in an exemplary embodiment. The installation may be initiated when a user 902 clicks 904 on an icon for an uninstalled application displayed as part of the application hub user interface 906 on the client computing device 904. As was mentioned above, in some exemplary embodiments, other actions via the user interface may trigger installation of an uninstalled application. In response to the clicking on the icon of the uninstalled application, the application ID 908 for the uninstalled application is provided to the application hub client service administrator 910. The hub client services 910 initiates a request 912 to get an installer program for the uninstalled application with the specified application ID via the Appstore API. The installer is received 916 by the application hub client services 910. The application is then installed locally on the client computing device using the installer and the manifest of installed applications is updated 918. The installed application is displayed as installed 920 in the application hub user interface 922.

Figure 10:
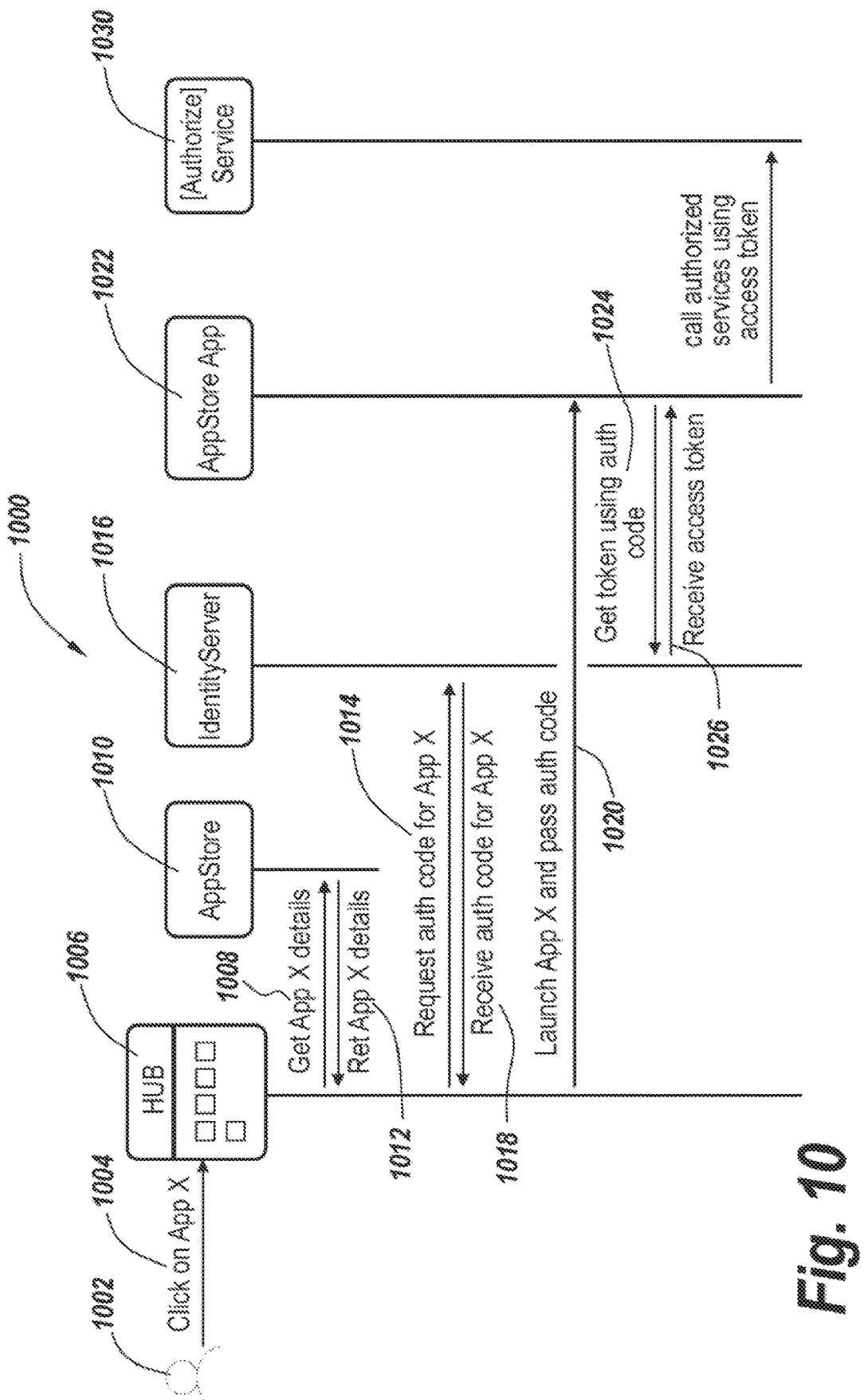
FIG. 10 depicts actions that may be taken to launch an application in exemplary embodiments.

Once the application has been installed, it may be launched for use by the user on the client computing device. FIG. 10 depicts actions taken to launch an installed application. A user 1002 may take an action, such as clicking on an installed application icon 1004 of the application hub user interface 1006, to initiate the launching of the installed application. A request 1008 is sent to get details regarding the application from the Appstore 1010. These details are returned 1012 from the Appstore 1010 and are used in formulating a request for an authorization code for the application 1014 that is sent to the identity server 1016. If the user is authorized, the identity server returns 1018 an authorization code for the application. The application is launched, and the authorization code is passed 1020 to the Appstore 1022. The Appstore 1022 requests an access token 1024, that is passed 1026 to the Appstore 1022 from the identity server 1016. The authorized services are called using the access token 1028.

Figure 11A:
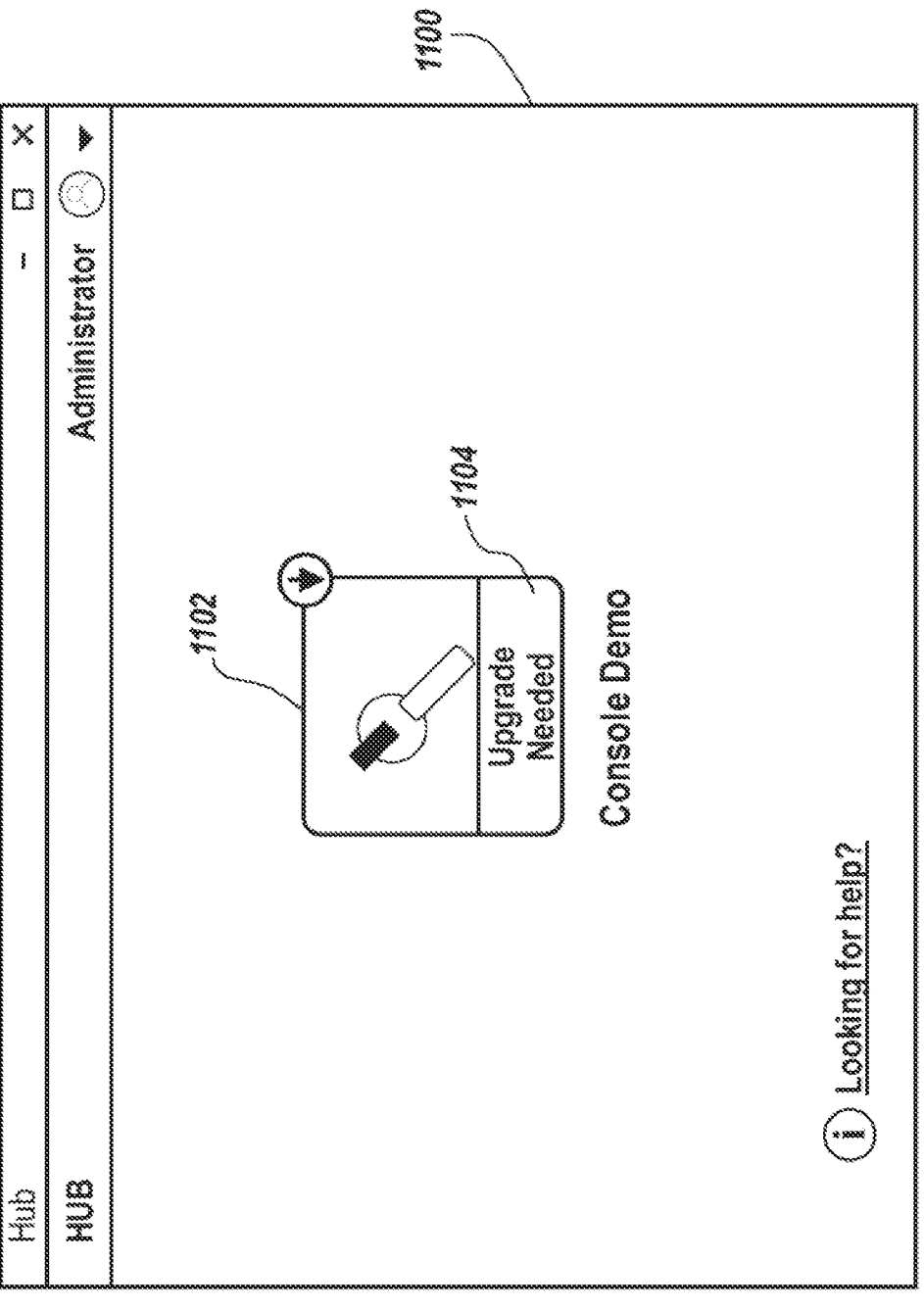
FIG. 11A depicts an illustrative icon for an application that needs to be updated.

As was mentioned above, the user interface from the application hub may indicate that an installed application needs an update. FIG. 11A provides an example of an icon

Figure 11B:
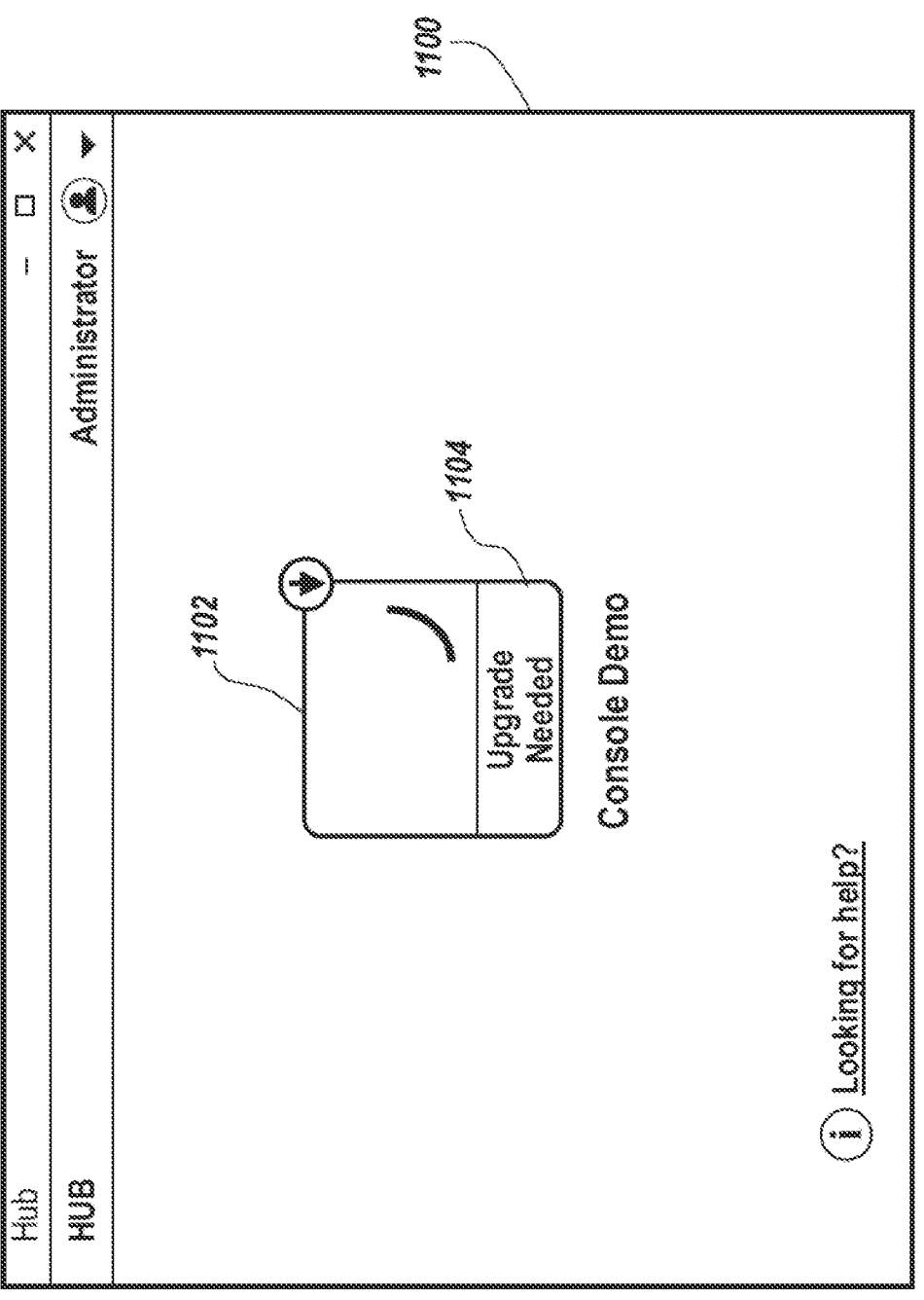
FIG. 11B depicts a changing appearance of the icon of FIG. 11A to reflect that an update of the application is underway.

1102 on the application hub user interface 1100 indicating that the console demo application needs to be updated. The icon 1102 includes the text "Upgrade Needed" to provide a visual clue that an update is warranted. Taking an action such as clicking on the icon 1102 may initiate the updating of the application. Other user interface actions may initiate the updating in some embodiments. The icon 1102 may change appearance such as shown in FIG. 11B to indicate that the update is in progress. The update is realized by installing the updated version of the application, such as was described above relative to FIG. 9.

Figure 12:
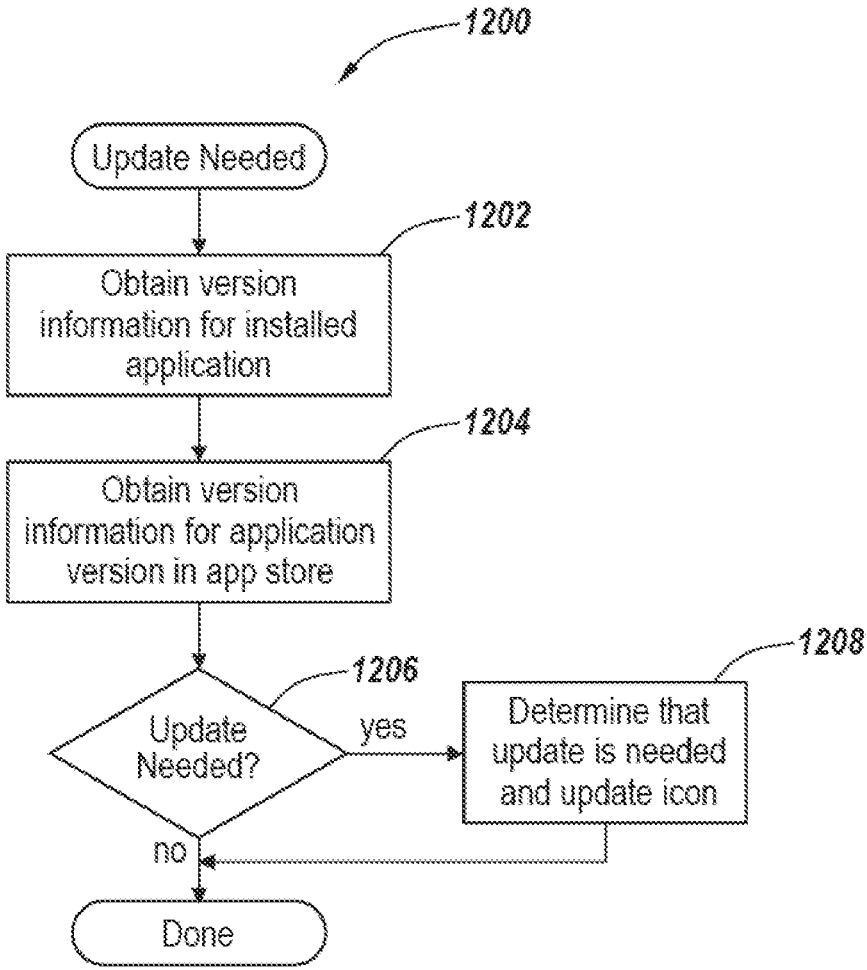
FIG. 12 depicts a flowchart of the steps that may be performed to determine is an update is needed for an application in exemplary embodiments.

The displaying of an icon indicating that an upgrade is needed may be prompted by a user selecting the icon or by a process performed regularly to ensure that all applications on the client computing device are current. FIG. 12 provides a flowchart 1200 of steps that may be performed to determine if an installed application on the client computing device is current or not. Version information for the installed application on the client computing device is obtained (1202). In some instances, this may entail looking at product codes and upgrade codes for the installed applications. This information may be associated with the manifest in some cases. The version information may also be obtained for the version available at the Appstore (1204). The version information regarding the applications are compared and a determination is made whether an update of the installed application is needed (1206). If an update is needed, the icon or other user interface element may be modified to note that an update is needed (1208). If no update is needed, no further action is needed.

Figure 13:
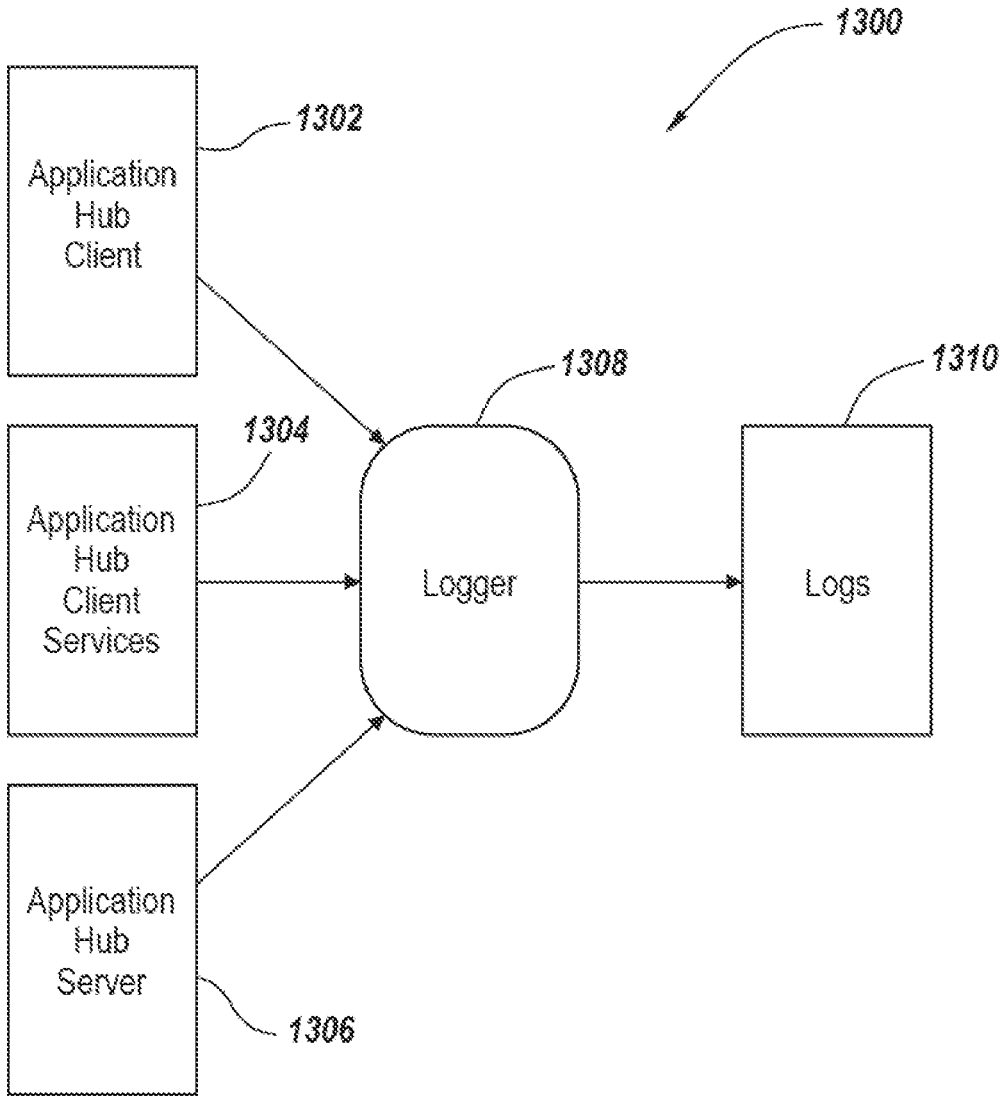
FIG. 13 depicts a block diagram of an environment for logging log messages for applications in an exemplary embodiment.

The exemplary embodiments may support logging of event information from the applications. As shown in FIG. 13, an environment 1300 includes the applications: application hub client 1302, application hub clients service administrator 1304 and application hub server 1306, as described above. A logger 1308 logs events that occur with the applications 1302, 1304 and 1306. The logger 1308 may in some embodiments be realized as a logging library, such as Serilog, that provides the functionality of logging events, filtering and forwarding the log entries regarding events to designated locations. Other logging tools may be used. The logger 1308 logs the events into logs 1310. Separate logs may be provided for each application. The log entries may be viewed using log viewing tools, such as Glogg or BareTail, for example.

The logger 1308 may allow the customization of the logging on a per application basis. The logging may be customized to specify the level of logging. The level specifies how much information and what type of information regarding events is logged. This table provides information regarding what may be appropriate log levels and provides examples:

| Log Level | Details | Log level example in config file |
|---|---|---|
| Verbose | Very low level debugging/internal info | "LogLevel": "Verbose" |
| Debug | Low level control logic, diagnostic info | "LogLevel": "Debug" |
| Information | Non internals information-what the system is doing | "Loglevel": "Information". |
| Warning | Information about possible problems | "LogLevel": "Warning", |
| Error | Unexpected failure-the system can still continue | "LogLevel": "Error", |
| Fatal | Stops the system and cannot continue | "LogLevel": "Fatal", |

The messages may include time stamps, level information and textual information regarding the event. The logger

1308 may log informational messages debug messages and error messages for the applications in an exemplary embodiment. The informational messages provide information regarding events in the application, whereas the error messages provide information regarding errors that occur in the application. As described above, the debug messages provide diagnostic information and low level control logic.

Here are some examples of information and error log messages for the application hub client 1302:

Client Information Messages:

Information: "Application is starting"

Information: "Application has exited"

Information: "AppClick( ) called with app id <applicationID>"

Information: "LaunchDefaultBrowser( ) called with URL <URL>"

Information: "Process <ProcessName> has been started"

Information: "Requested url <Address>"

Client Error Messages:

Error: "<AppConfigErrors>"//Failed to read application config

Error: "Application terminated <Exception details>"

Error: "Unhandled Exception <Exception details>"//Unhandled Exception on Startup of the waters_connect Hub Error: "Communication with application hub failed <Exception details>"

Error: "Clicked on unknown application type <applicationID>"

Error: "LaunchDefaultBrowser( ) error: <Exception details>"

Error: "AppClick( ) error: <Exception details> on desktop app"

Error: "AppClick( ) error: <Exception details> on web app"

Error: "Failed to start process <FileOrUrl> <Exception details>"

Error: "Failed to start process <processName> <Exception details>"

Error: "AppsPageController.GetApps( ) error: <Exception details>"

Error: "Cannot display page; <Exception details>"

Error: "Requested url: <AbsoluteUri> is not allowed!"

Here are some examples of the information and error messages that may be logged for the application hub client services:

Application Hub Client Services Information Messages:

Information: "Application <applicationID> install status: <IsInstalled>"

Information: "Starting installing application: <applicationID>"

Information: "Application <applicationID> install status: <IsInstalled>"

Information: "Gets the list of installed applications to display in the client"

Information: "Install app (if not available) and return app details for app id: <applicationID>"

Information: "Application is starting"

Information: "Starting server"

Information: "Configuring services"

Information: "Configuring Server"

Warning: "Server is running in developer mode"

Application Hub Client Services Error Messages:

Error: "Call to AppStore endpoint GetApplications failed with status: <AppStore Response StatusCode> <Exception details> <Exception details>"

</variable>

<variable name="col10">

Error: "Call to AppStore endpoint GetWebApplication for <applicationID> failed with status: <AppStore Response StatusCode> <Exception details>"

Error: "Call to AppStore endpoint GetDesktopApplication for <applicationID> failed. <Exception details>"

Error: "Call to AppStore endpoint GetDesktopApplication for <applicationID> failed with status: <AppStore Response StatusCode> <Exception details>"

Error: "The path to the installer is not correct <installerPath>"

Error: "The installation failed for <installerPath> <Exception details>"

Error: "Unable to download installer for app <applicationID> from AppStore. Returned <installerResponseStatusCode>"

Error: "Error in GetApplications <Exception details>"

Error: "Error:" AppStore is not available. Contact your system administrator. <Exception details>"

Error: "Installation error. Cannot install <ApplicationName> on the hub. Contact your system administrator. <Exception details>"

Error: "InternalServerError <Exception details>"

Error: InternalServerError AppStore is not available. <Exception details>"

Error: "Failed Get the web application: <applicationID> <Exception details>"

Error: "<AppConfigErrors>"//Failed to read application config

Here are some examples of the information and error messages that may be logged for the application hub server:

Application Hub Server Information Messages:

Information: "Application is starting"

Information: "Starting server"

Information: "Configuring services"

Information: "Configuring Server"

Warning: "Server is running in developer mode"

Application Hub Server Error Messages:

Error: "Failed to get localized resource. File not found"

Error: "Failed to get localized resource; <Exception details>"

Error: "<AppConfigErrors>"//Failed to read application config.

The resulting logs 1310 may be monitored to obtain ongoing information regarding the applications 1302, 1304 and 1306. Moreover, alerts may be triggered for errors based on the logging information, in the logs 1310 metrics may be gathered from the logging information in the logs 1310 and useful debugging information may be extracted from the logging information in the logs 1310.

Each of the logs 1310 may have a size limit, such that when the limit is reached, a new log is created automatically. In addition, there may be a limit as to the number of log files. When the limit is reached, the oldest log file may be deleted and a new one may be created.

While the present invention has been described with reference to exemplary embodiments herein, those skilled in the art will appreciate that various changes in form and detail may be made without departing from the intended scope of the invention as defined in the appended claims.

The invention claimed is:

1. A method performed by a client computing device, comprising:

receiving a user interface at the client computing device from an application hub, that is running on an application hub computing devices, wherein the application hub serves as a landing site where a client via the client computing device launches applications for an analyti- </variable>

</variable> cal services platform, wherein the analytical services platform is interfaced with at least one analytical device to receive data from the at least one analytical device and to perform one of filtering the received data or processing the received data, wherein the at least one analytical device comprises a chromatography device or a mass spectrometer, and wherein the user interface identifies a selected application as needing to be updated;

based on input received via the user interface at the client computing device, obtaining an updated version of the selected application wherein an application hub client services is installed on the client computing device; and installing the updated version of the selected application on the client computing device as a background process wherein the installing the updated version of the selected application comprises the application hub client services launching an installer to install the updated version of the selected application.

2. The method of claim 1, wherein the obtaining the updated version of the selected application comprises the application hub client services retrieving the updated version of the selected application from an application repository.

3. The method of claim 2, wherein the application repository is remote from the client computing device.

4. The method of claim 1, wherein the input received via the user interface is indicative of selection of a user interface element of the user interface for the selected application.

5. The method of claim 1, further comprising determining whether a version of the selected application is a current version.

6. A non-transitory processor-readable storage medium storing programming instructions to cause a processor to: receive a user interface at a client computing device from an application hub, that is running on an application hub computing device, wherein the application hub serves as a landing site where a client via the client computing device launches applications for an analytical services platform, wherein the analytical services platform is interfaced with at least one analytical device to receive data from the at least one analytical device and to perform one of filtering the received data or processing the received data, wherein the at least one analytical device comprises a chromatography device or a mass spectrometer, and wherein the user interface identifies a selected application as needing to be updated;

based on input received via the user interface at the client computing device, obtain an updated version of the selected application wherein an application hub client services is installed on the client computing device; and installing the updated version of the selected application on the client computing device as a background process wherein the installing the updated version of the selected application comprises the application hub client services launching an installer to install the updated version of the selected application.

7. The non-transitory processor-readable storage medium of claim 6, wherein the obtaining of the updated version of the selected application comprises the application hub client services retrieving the updated version of the selected application from an application repository.

8. The non-transitory processor-readable storage medium of claim 7, wherein the application repository is remote from the client computing device.

9. The non-transitory processor-readable storage medium of claim 6, wherein the input received via the user interface is indicative of selection of a user interface element of the user interface for the selected application.

10. The non-transitory processor-readable storage medium of claim 6, further comprising determining whether a version of the selected application is a current version.

11. A device, comprising: a non-transitory processor-readable storage medium for storing programming instructions; and a processor configured for executing the programming instructions to cause the processor to: receive a user interface at a client computing device from an application hub, that is running on an application hub computing device, wherein the application hub serves as a landing site where a client via the client computing device launches applications for an analytical services platform, wherein the analytical services platform is interfaced with at least one analytical device to receive data from the at least one analytical device and to perform one of filtering the received data or processing the received data, wherein the at least one analytical device comprises a chromatography device or a mass spectrometer, and wherein the user interface identifies a selected application as needing to be updated;

based on input received via the user interface at the client computing device, obtain an updated version of the selected application wherein an application hub client services is installed on the client computing device; and installing the updated version of the selected application on the client computing device as a background process wherein the installing the updated version of the selected application comprises the application hub client services launching an installer to install the updated version of the selected application.

12. The device of claim 11, wherein the obtaining of the updated version of the selected application comprises the application hub client services retrieving the updated version of the selected application from an application repository.

13. The device of claim 12, wherein the application repository is remote from the client computing device.

14. The device of claim 12, wherein the input received via the user interface is indicative of selection of a user interface element of the user interface for the selected application.

* * * * *